US012316648B1

(12) United States Patent
Kienow et al.

(10) Patent No.: US 12,316,648 B1
(45) Date of Patent: May 27, 2025

(54) DATA VALUE CLASSIFIER

(71) Applicant: Rapid7, Inc., Boston, MA (US)

(72) Inventors: Matthew Kienow, Dayton, OH (US); Brent Cook, Austin, TX (US)

(73) Assignee: Rapid7, Inc., Boston, MA (US)

( * ) Notice: Subject to any disclaimer, the term of this patent is extended or adjusted under 35 U.S.C. 154(b) by 713 days.

(21) Appl. No.: 16/519,789

(22) Filed: Jul. 23, 2019

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01)

(58) Field of Classification Search
CPC . H04L 63/1416; H04L 63/1425; H04L 63/14; G06N 20/00; G06N 3/088; G06N 3/08; H04W 12/122; G06F 16/214
See application file for complete search history.

(56) References Cited

U.S. PATENT DOCUMENTS

| | | | | |
|---|---|---|---|---|
| 8,495,745 B1 * | 7/2013 | Schrecker | ............... | H04L 63/00 726/25 |
| 8,677,505 B2 * | 3/2014 | Redlich | ................. | H04L 9/3271 715/255 |
| 9,152,953 B2 * | 10/2015 | Lai | ....................... | G06Q 10/107 |
| 10,129,195 B1 * | 11/2018 | Jakobsson | ........... | H04L 63/1408 |
| 10,277,628 B1 * | 4/2019 | Jakobsson | ........... | H04L 63/1483 |
| 10,581,780 B1 * | 3/2020 | Jakobsson | ........... | G06Q 10/107 |
| 10,681,060 B2 * | 6/2020 | Scheidler | ............... | G06N 20/00 |
| 10,754,958 B1 * | 8/2020 | Sidagni | ................. | G06F 21/552 |
| 11,966,953 B1 * | 4/2024 | Peshwe | ..................... | G06N 3/08 |
| 12,099,911 B2 * | 9/2024 | Cella | ........................ | H04W 4/38 |
| 12,101,334 B2 * | 9/2024 | Thomas | ................ | H04L 63/145 |
| 2008/0052395 A1 * | 2/2008 | Wright | ................... | H04W 4/029 709/224 |
| 2012/0143798 A1 * | 6/2012 | Sundelin | ............... | H04L 51/212 706/12 |
| 2012/0150773 A1 * | 6/2012 | DiCorpo | ................ | G06N 20/00 706/12 |
| 2013/0339276 A1 * | 12/2013 | Lai | ........................ | G06Q 10/107 706/12 |
| 2015/0310195 A1 * | 10/2015 | Bailor | ..................... | G06F 21/45 726/6 |
| 2017/0063911 A1 * | 3/2017 | Muddu | ................... | G06N 20/20 |
| 2018/0314973 A1 * | 11/2018 | Sinha | ..................... | G06N 20/00 |

(Continued)

FOREIGN PATENT DOCUMENTS

| | | | | |
|---|---|---|---|---|
| CN | 108154125 A | * | 6/2018 | ......... G06K 9/00342 |
| CN | 110010123 A | * | 7/2019 | |

(Continued)

OTHER PUBLICATIONS

Title: Deep Learning for detecting inappropriate content in text Authors: Harish Yenala, Arshish Jhanwar, manoj K. Chinnakotla, Jay Goyal Title date:2017.*

(Continued)

*Primary Examiner* — Shahriar Zarrineh
*Assistant Examiner* — Gita Faramarzi
(74) *Attorney, Agent, or Firm* — Ashwin Anand

(57) ABSTRACT

Methods and systems for identifying targets on a network. The disclosed methods involve classifying data as valuable or non-valuable, and then classifying an asset associated with the retrieved data as a target or a non-target based in part on the classification of the data.

12 Claims, 4 Drawing Sheets

(56) References Cited

U.S. PATENT DOCUMENTS

| | | | |
|---|---|---|---|
| 2018/0349817 A1* | 12/2018 | Goel | G06F 30/13 |
| 2019/0042737 A1* | 2/2019 | Krebs | H04L 43/062 |
| 2019/0172581 A1* | 6/2019 | Zlotnick | G06N 3/08 |
| 2019/0182289 A1* | 6/2019 | White | G06F 21/6245 |
| 2019/0205429 A1* | 7/2019 | Lee | G06F 16/214 |
| 2019/0220863 A1* | 7/2019 | Novick | G06Q 20/10 |
| 2019/0236608 A1* | 8/2019 | Formsma | G06N 7/01 |
| 2019/0378051 A1* | 12/2019 | Widmann | G06N 20/00 |
| 2020/0201827 A1* | 6/2020 | Chacko | G06F 9/4451 |
| 2020/0327252 A1* | 10/2020 | McFall | G06F 21/78 |
| 2020/0382527 A1* | 12/2020 | Mitelman | G06N 20/20 |
| 2020/0401497 A1* | 12/2020 | Saeki | G06F 11/3447 |
| 2021/0089647 A1* | 3/2021 | Suwad | G06F 21/552 |

FOREIGN PATENT DOCUMENTS

| | | | | |
|---|---|---|---|---|
| DE | 102019124267 A1 * | 4/2020 | | F02D 28/00 |
| JP | 2020119250 A * | 8/2020 | | |
| WO | WO-2020102395 A1 * | 5/2020 | | G06N 20/00 |

OTHER PUBLICATIONS

Title: Deep Learning for Data Privacy Classification Authors: Griffin Bishop, Leo Grande, Samuel Pridotkas, Harutyun Sadoyan Title date: 2018.*

* cited by examiner

DATA VALUE CLASSIFIER

TECHNICAL FIELD

Embodiments described herein relate to methods and systems for monitoring networks and, more particularly but not exclusively, to methods and systems for identifying targets on a network.

BACKGROUND

Due to their prevalence in today's society, the internet and other types of networks have become a hub for criminal activity. Often times cyber-criminals or other threat actors attempt to install or otherwise deploy harmful applications on unprotected systems. Once a threat actor obtains access to a targeted system or device, they may perform further actions such as stealing data, escalating their privileges, or the like.

Security personnel therefore aim to protect sensitive data from theft and prevent unauthorized access to network assets. However, it is often difficult to understand which data is sensitive and should be more closely monitored and protected. Similarly, it is difficult to know which network assets are most at risk of being victims of malicious activity.

Traditional data loss prevention (DLP) systems use a fixed set of patterns to classify data that may be at risk. These approaches are static in nature, and are generally unable to recognize data or assets that should be scrutinized and more vigorously protected.

A need exists, therefore, for systems and methods that more effectively identify targets on a network.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for identifying targets on a network. The method includes retrieving data from an asset connected to the network, classifying the retrieved data with a classifier executing a machine learning model configured to classify the data as valuable or non-valuable, and classifying the asset as a target or a non-target based in part on the classification of the data.

In some embodiments, the method includes providing a score indicating a likelihood the data is valuable or a likelihood the data is non-valuable.

In some embodiments, the method includes updating the machine learning model with at least one of classification rules matching the data and user-guided feedback to improve classification accuracy.

In some embodiments, the classifier is further configured to provide an asset risk score representing the asset's security risk. In some embodiments, the asset risk score is based on at least one of who has access to the asset, when data first appeared on the asset, frequency of data modifications, time of last data modification, and time of last data access. In some embodiments, the asset risk score is based on a likelihood that the data can be accessed externally.

In some embodiments, the classification of the data as valuable is based on at least one of personally identifiable information included in the data, a password in the data, access tokens in the data, hashed values in the data, private keys in the data, markings indicating confidential or secret data, and user-specified value words selected from the group consisting of project code-names and trade secret names.

In some embodiments, the machine learning model is implemented as a convolutional neural network.

In some embodiments, the method includes implementing a security measure with respect to the data upon classifying the data as valuable.

In some embodiments, the method further includes providing a monetary value associated with the data classified as valuable.

According to another aspect, embodiments relate to a system for identifying targets on a network. The system includes an interface for receiving data from an asset connected to the network, and a processor executing instructions stored on a memory to provide a classifier executing a machine learning model configured to classify the data as valuable or non-valuable and classify the asset as a target or a non-target based in part on the classification of the data.

In some embodiments, the classifier is further configured to provide a score indicating a likelihood the data is valuable or a likelihood the data is non-valuable.

In some embodiments, the processor further executes instructions stored on the memory to update the machine learning model with at least one of classification rules matching the data and user-guided feedback to improve classification accuracy.

In some embodiments, the classifier is further configured to provide an asset risk score representing the asset's security risk. In some embodiments, the asset risk score is based on at least one of who has access to the asset, when data first appeared on the asset, frequency of data modifications, time of last data modification, and time of last data access. In some embodiments, the asset risk score is based on a likelihood that the data can be accessed externally.

In some embodiments, the classification of the data as valuable is based on at least one of personally identifiable information included in the data, a password in the data, access tokens in the data, hashed values in the data, private keys in the data, markings indicating confidential or secret data, and user-specified value words selected from the group consisting of project code-names and trade secret names.

In some embodiments, the machine learning model is implemented as a convolutional neural network.

In some embodiments, the processor is further configured to implement a security measure with respect to the data upon classifying the data as valuable.

In some embodiments, the processor is further configured to calculate a monetary value associated with the data classified as valuable.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
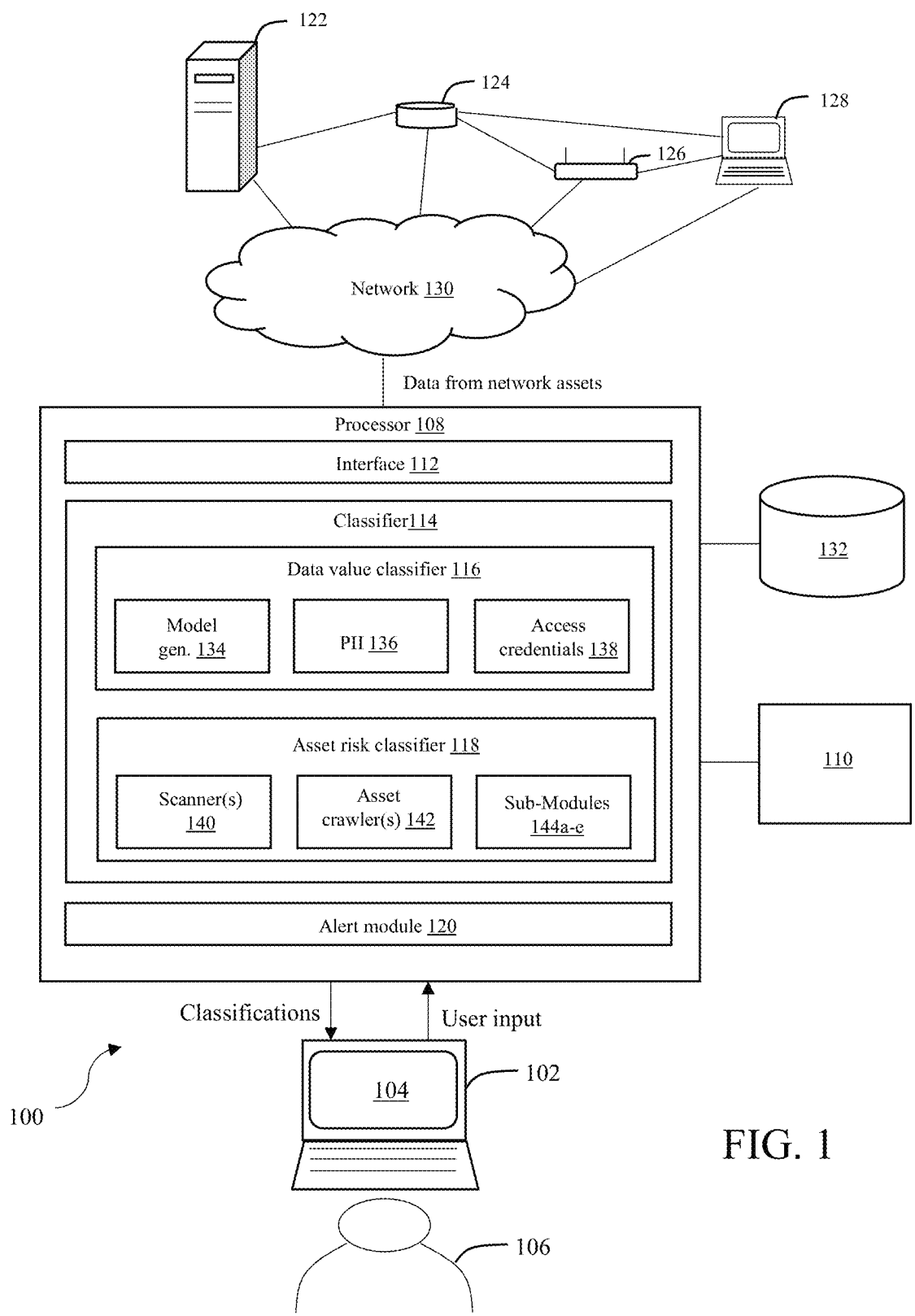
FIG. 1 illustrates a system for identifying targets on a network in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Existing DLP systems can determine whether a network resource could be exploited. However, these existing systems do not assess how valuable that resource is to a user or a company. A vulnerable resource that has no valuable data or information is less interesting to an attacker than a secure resource that has or is otherwise associated with valuable data.

A problem for defenders and attackers is therefore identifying which resources contain valuable information. Once known, attackers may adjust their attack patterns and defenders can adjust their defenses to ensure that important assets and data are well monitored and defended.

The systems and methods described herein overcome the shortcomings of existing DLP systems by implementing two complementary sub-systems. The first is a data value classifier to classify data as valuable or non-valuable, and the second is an asset risk classifier to classify an asset associated with the data as a target or a non-target based in part on the classification of the associated data as valuable or non-valuable. Based on these classifications, the systems and methods described herein can classify network assets as targets or non-targets.

FIG. 1 illustrates a system 100 for identifying targets on a network in accordance with one embodiment. The system 100 includes a user device 102 executing a user interface 104 for presentation to one or more users 106 such as security personnel or other users interested in identifying targets on a network.

The user device 102 may be any hardware device capable of executing the user interface 104. The user device 102 may be configured as a laptop, PC, tablet, mobile device, or the like. The exact configuration of the user device 102 may vary as long as it can execute and present the user interface 104 to the user 106. The user interface 104 may allow the user 106 to supply parameters regarding which log records to analyze and other types of parameters.

The user 106 may include security personnel tasked with ensuring the security of an entity's network (e.g., a network associated with a private company or institution, a governmental body, an educational institution, or the like). Accordingly, the user 106 would want to know where valuable data is located on the network and whether network assets or devices associated with valuable data are at risk.

The user 106 may alternatively be an offensive security practitioner. In this case, the user 106 may be hired as part of a team to test a network's security. Accordingly, this type of user 106 would similarly want to know where valuable data is located on the network, and which asset(s) associated with valuable data can be exploited.

The user device 102 may be in operable communication with one or more processors 108. The processor(s) 108 may be any hardware device capable of executing instructions stored on memory 110 to accomplish the objectives of the various embodiments described herein. The processor(s) 108 may be implemented as software executing on a microprocessor, a field programmable gate array (FPGA), an application-specific integrated circuit (ASIC), or another similar device whether available now or invented hereafter.

In some embodiments, such as those relying on one or more ASICs, the functionality described as being provided in part via software may instead be configured into the design of the ASICs and, as such, the associated software may be omitted. The processor(s) 108 may be configured as part of the user device 102 on which the user interface 104 executes, such as a laptop, or may be located on a different computing device, perhaps at some remote location.

The processor 108 may execute instructions stored on memory 110 to provide various modules to accomplish the objectives of the various embodiments described herein. Specifically, the processor 108 may execute or otherwise include an interface 112, a classifier 114 executing a data value classifier 116 and an asset risk classifier 118, and an alert module 120.

The memory 110 may be L1, L2, L3 cache or RAM memory configurations. The memory 110 may include non-volatile memory such as flash memory, EPROM, EEPROM, ROM, and PROM, or volatile memory such as static or dynamic RAM, as discussed above. The exact configuration/type of memory 110 may of course vary as long as instructions for identifying targets on a network can be executed by the processor 108 to accomplish the objectives of various embodiments described herein.

The interface 112 may be in communication with or otherwise receive data from one or more network assets 122, 124, 126, 128 over one or more networks 130. The network assets may include, but are not limited to, a server 122, a hub 124, a router 126, a laptop 128, or the like. The network assets 122, 124, 126, and 128 of FIG. 1 are only exemplary, and any other type of assets may be considered in conjunction with the embodiments described herein.

The assets 122, 124, 126, and 128 may have data collection agents running thereon, wherein these assets may communicate or otherwise report data regarding the asset's operation to the processor 108. Additionally or alternatively, the processor 108 may execute one or more asset crawlers to look for data to assess on the target network(s) 130.

The network(s) 130 may link the various devices with various types of network connections. The network(s) 130 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 130 may also comprise, include, or interface to any one or more of a Wireless Application Protocol (WAP) link, a Wi-Fi link, a microwave link, a General Packet Radio Service (GPRS) link, a Global System for Mobile Communication G (SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The classifier 114 provides two complementary subsystems (i.e., the data value classifier 116 and the asset risk classifier 118). In accordance with the embodiments described herein, the data value classifier 116 may classify data as valuable or non-valuable, and the asset risk classifier 118 may then classify whether an asset associated with the data is at risk and a target based in part on whether the asset is associated with valuable data.

The data value classifier 116 may identify sensitive or confidential information from either structured or unstructured data. In the context of the present application, the term "structured" may refer to data that generally has a well known pattern. For example, social security numbers may qualify as an item of structured data, as social security numbers generally consist of three numerals, followed by a dash "-", followed by two numerals, followed by a dash "-", followed by four numerals (i.e., xxx-xx-xxxx). "Unstructured data," on the other hand, may include data that is not in any particular format.

Additionally, the data value classifier 116 may classify data as valuable or non-valuable regardless of whether the data of interest is in transit or in storage. Often times security personnel may be unaware of where valuable data is located as data may be copied and communicated across the network(s) 130. Accordingly, the data value classifier 116 may analyze and classify data whether the data is stored in a known location or in transit.

In use, the model generation module 134 may train a machine learning model based on data stored in one or more databases 132. This data may relate to data (e.g., phone numbers, bank account numbers, social security numbers, etc.) that has been previously labeled as "valuable" or "non-valuable."

The model generation module 134 may identify patterns in the received data and generalize those patterns for subsequent application. In some embodiments, the model generation module 134 may be implemented as or otherwise be based on a convolutional neural network (CNN) or other type of machine learning framework useful in text sequencing and pattern identification.

Figure 2:
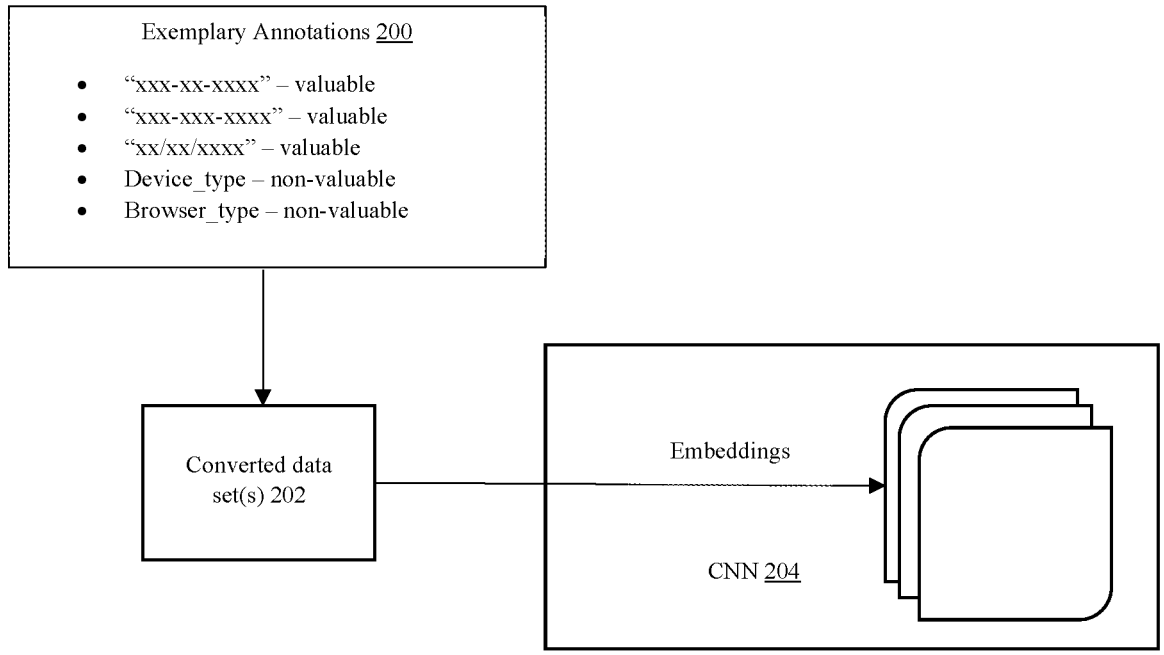
FIG. 2 illustrates exemplary annotations of various types of data and their valuable or non-valuable classifications in accordance with one embodiment.

For example, FIG. 2 illustrates exemplary annotations 200 including data formats and labels of whether they are valuable or non-valuable. "Valuable" information may include personally identifiable information (PII) which is defined by the National Institute of Standards and Technology (NIST) Special Publication as "any information about an individual maintained by an agency, including (1) any information that can be used to distinguish or trace an individual's identify, such as name, social security number, date and place of birth, mother's maiden name, or biometric records; and (2) any other information that is linked or linkable to an individual, such as medical, educational, financial, and employment information." Similarly, "valuable" data may also include access credentials such as usernames, passwords, access tokens, hashed password values, private keys (e.g., SSH, GPG, SSL, etc.).

"Non-valuable" data may include data that is anonymous or otherwise does not identify an individual. Accordingly, this type of data generally does not require encryption before it is transmitted. Non-valuable data may include data collected by browsers and servers using cookies, for example.

As seen in FIG. 2, data in the form of "xx/xx/xxxx" may be indicated as valuable as this is the format for date of birth (which is commonly used to confirm a user's identity). Similarly, and as discussed above, data in the form of "xxx-xx-xxxx" may be indicated as valuable as this is the format for social security numbers. However, data such as the type of browser used or type of device used may be indicated as non-valuable, as this type of data is generally not sensitive in nature nor used to identify an individual.

The exemplary annotations 200 may undergo any required pre-processing steps to obtain one or more converted data sets 202. This may involve processing the training data (i.e., the annotations 200) into plain-text format. This allows the processor 108 and, specifically, the model generation module 134 to ingest and train models based on various data formats.

As seen in FIG. 2, for example, a CNN 204 may be trained on labeled data items from the data stored in the one or more databases 132. This corpus of data may be built from hundreds of pieces of data and their corresponding labels. These may be collected over a period of time and from different network assets.

During training, the CNN 204 may receive the labeled data and convert them into a matrix to represent each item and its label as numbers. The CNN 204 may also analyze embedded items to learn or otherwise distinguish various types of data and their corresponding labels.

Once trained, the model may receive previously unseen data for analysis. If necessary, the previously unseen data may be subject to certain pre-processing steps to facilitate its analysis by the trained model. For example, the data may be made more suitable for analysis by converting all text to lowercase, uppercase, etc.

Pre-processing may additionally or alternatively break a string into discrete elements to aid in analysis. This may involve, for example, recognizing the meaning of spaces, periods, punctuation marks, and their meanings with respect to individual items of a log record.

Accordingly, the generated model may be robust in terms of recognizing certain data as valuable even if the data is not in the exact format on which the model was trained. For example, the model may recognize a string comprising nine numerals as a social security number, even if the string does not include any dashes.

The generated model may be implemented as one or more of a PII model 136 (trained to identify personal identification information) or an access credentials model 138 (trained to identify credentials). In some embodiments, the functionality performed by the PII model 136 and the access credentials model 138 may be performed by a single model.

If the model(s) are implemented as a CNN, the output may be a score indicating a likelihood that a particular piece of data is valuable. For example, the score may be from 0 to 1 wherein a value closer to 1 indicates a piece of data is likely valuable. The model may also output the reasoning behind the outputted score, such as that a particular piece of data looks like a social security number, a phone number, etc.

The data value classifier 116 may output the returned classification labels to the user 106 via the user interface 104. This provides the user 106 with an opportunity to not only review potential data of interest, but also to provide feedback regarding the outputted classification.

For example, the user 106 may confirm whether a piece of data should actually be classified as valuable or non-valuable. The provided feedback may also include risk weights to certain data features, such that future data containing those features may be more likely classified as valuable (or non-valuable).

Once data is classified as valuable, the processor 108 may then determine whether the network asset(s) associated with valuable data is at risk and is therefore a target. The asset risk classifier 118 may identify a network asset's risk classification based on a combination of external network-based scanners to detect exposed services and agent software executed locally to an asset.

The asset risk classifier 118 may be trained on data stored in one or more databases 132. The asset risk classifier 118 may include or otherwise be in communication with one or more scanners 140. The scanner(s) 140 may include one or more scanning tools configured to gather data regarding exposed services. As discussed previously, the asset risk classifier 118 may include one or more asset crawler(s) 142 to gather data regarding an asset's operation.

Figure 3:
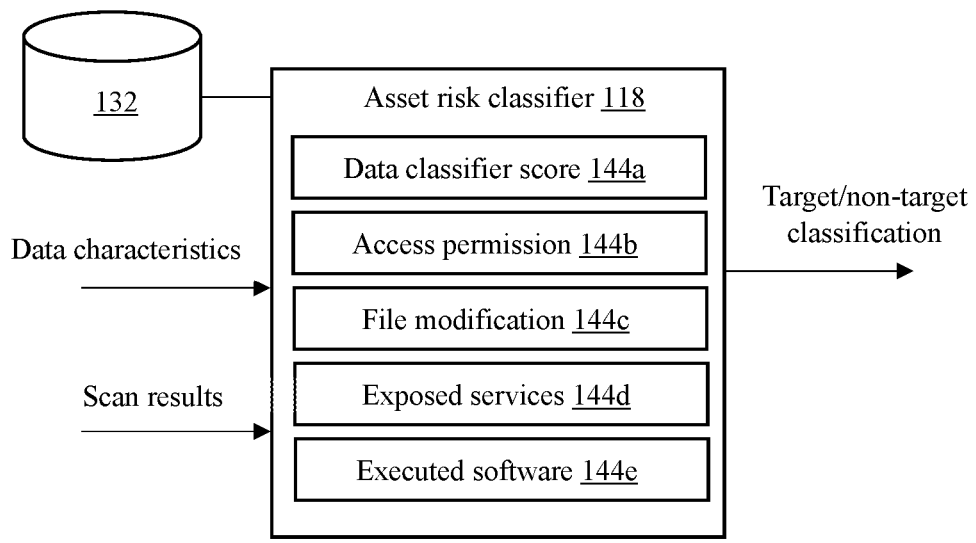
FIG. 3 illustrates the asset risk classifier of FIG. 1 in accordance with one embodiment.

FIG. 3 illustrates the asset risk classifier 118 of FIG. 1 in more detail. In operation, the asset risk classifier 118 may receive as inputs results of the scans as well as data regarding characteristics of the data under analysis. As seen in FIG. 3, the asset risk classifier 118 may execute one or more sub-modules 144a-e to analyze specific types of data to determine whether a network asset is at risk.

For example, the asset risk classifier 118 may include one or more of a data classifier score module 144a, an access permission module 144b, a file modification module 144c, an exposed services module 144d, an executed software module 144e, or the like.

The data classifier score module 144a may receive as input the classification score received from the data value classifier 116. The data classifier 116 may determine that network assets associated with only data assigned a low score (e.g., less than 0.1), which is likely not valuable, are therefore not at risk. This may be based on the assumption that threat actors are not interested in network assets that are only associated with non-valuable data.

The access permission module 144b may consider data related to who has access to the network asset. This data may be stored in the one or more databases 132. This feature may be relevant as network assets that a large number of people have access to may be more at risk of malicious behavior. Accordingly, network assets accessible by many people may be more likely to be the victim of malicious behavior.

The file modification module 144c may consider data related to how often one or more files on the network asset are modified, as well as the time of the most recent modification. This feature may be relevant as network assets with files that are frequently modified or modified recently may be more likely to include active projects with sensitive information. This is opposed to files that have not been accessed for several months or years.

The exposed services module 144d may consider data related to services exposed on the network asset under analysis. This data may include whether the asset is communicating with other devices on a network, for example. Communication with one or more external network assets may suggest the network asset is at risk of, for example, an exfiltration attempt.

The executed software module 144e may similarly consider the type of software executing or executed on the network asset. This may include certain programs or applications, as well as software versions thereof. For example, the one or more databases 132 may store data regarding which software versions of certain programs have known vulnerabilities. Accordingly, the executed software module 144e may consider whether a network asset is executing a version of software that is known to have a vulnerability.

The asset risk classifier 118 may analyze the output of one or more of the various sub-modules 144a-e in a variety of ways. In some embodiments, the asset risk classifier 118 may output a decision that a network asset is at risk (and therefore a target) only if two or more of the sub-modules 144a-e provide a "vote" that the associated data indicates the network asset is at risk.

The sensitivity of the asset risk classifier 118 may be adjusted and may depend on the application. For example, some applications or assets may be less sensitive and require that all five sub-modules 144a-e of the asset risk classifier 118 output an "at risk" vote before the asset risk classifier 118 determines the network asset is at risk and therefore a target. Other, more sensitive applications may require that only one of the sub-modules 144a-e output an "at risk" vote before the asset risk classifier 118 determines the network asset is at risk and therefore a target.

In some embodiments, a stronger showing of one or more types of data or asset characteristics may make up for a lesser showing of other characteristics. For example, the score provided by the data value classifier 116 indicating data associated with an asset may be only 0.4. However, the exposed services module 144d may identify several outdated and vulnerable software services executing on the asset. Due to the nature and number of detected vulnerabilities, the asset risk classifier 118 may output a decision that the network asset is at risk and therefore a target even though the data is not likely valuable.

The above types of data considered by the asset risk classifier 118 are merely exemplary. Other types of data in addition to or in lieu of those discussed above may be considered by the asset risk classifier 118 in determining whether an asset is at risk of malicious behavior. This data may include, but is not limited to, when data first appeared on the asset, age of the data, agent software executed locally to the asset, users that have access to the data, configured software on the asset, user credentials, data and metrics regarding the asset such as the type of the asset (e.g., whether it is a server, a workstation, a notebook, a mobile device, etc.) and the asset user(s) and their role(s) within an organization.

In some embodiments, an alert module 120 may issue an alert to a user 106 upon detecting an asset is a target. These types of alerts may be presented to the user 106 via the user interface 104 and may be a visual alert, a text alert, an audio alert, a haptic-based alert, or some combination thereof. A user may investigate the data further and perform any appropriate mitigation steps. Additionally or alternatively, these mitigation steps may be implemented autonomously. For example, an asset identified as a target may be quarantined such that no data may be communicated to or therefrom.

Figure 4:
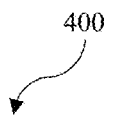
FIG. 4 depicts a table showing exemplary risk classifications of a plurality of network assets in accordance with one embodiment.

FIG. 4 depicts an exemplary table 400 showing the risk classifications of a plurality of assets on a network. Using the components and techniques described above, a user interface such as the user interface 104 of FIG. 1 may present this type of table 400 to a user for analysis. A user may then recognize that the network asset named "workstation-05" has data that is of high value to threat actors, but is a low risk asset. On the other hand, asset "file-share-01" is associated with data that is of low value to attackers, but is classified has being a high risk asset.

"Workstation-01" may be of the most concern to a user, as this asset is associated with data that is of medium value to threat actors and is also classified as being at medium risk. Accordingly, based on the exemplary data of FIG. 4, a user may implement one or more security measures with respect to workstation-01. Additionally or alternatively, these measures may be implemented autonomously, or at the very least the alert module 120 may communicate an alert to the user.

Figure 5:
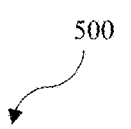
FIG. 5 depicts value classifications of files associated with one of the assets of FIG. 4 in accordance with one embodiment.

The risk classification and value assigned to the assets in FIG. 4 may be based on a one or more individual data files associated with the assets. For example, FIG. 5 illustrates an exemplary table 500 listing data files associated with the asset file-share-01 of FIG. 4.

Table 500 lists three data files; Payroll-2019-05, d83554.tmp, and users-2019.accdb. Each of these data files have been assigned a classification value of either high, medium, or low that represents their risk. As seen in FIG. 5, each of these data files are classified as including PII, and are associated with a confidence score representing the confidence in that classification. For example, Payroll-2019-05 is classified as including PII and has a confidence score of 0.98, which represents that there is a very high likelihood that the file includes PII.

Table 500 also lists data such as the update frequency of the data files, as well as the age of the data. As discussed previously, these types of features as well as others may be considered in calculating a data file's value and (and therefore risk classification).

As seen from table 500, the file Payroll-2019-05 is classified as highly valuable. Assuming the filename is accurate (i.e., Payroll-2019-05 includes payroll-related data), this is expected as this file likely includes data related to employees and finances.

Figure 6:
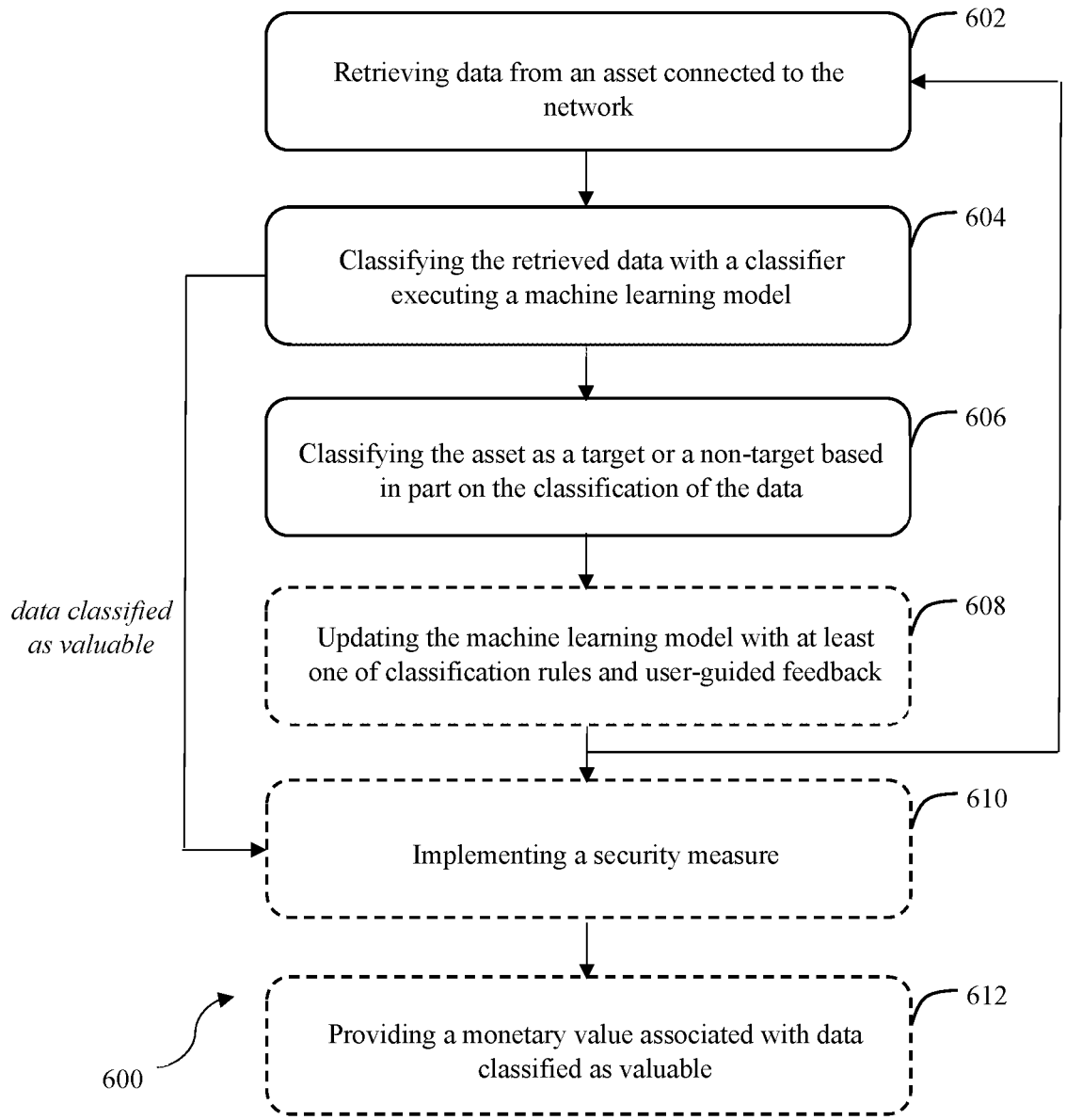
FIG. 6 depicts a flowchart of a method for identifying targets on a network in accordance with one embodiment.

FIG. 6 depicts a flowchart of a method 600 for identifying targets on a network in accordance with one embodiment. Method 600 may be performed by a system such as the system 100 of FIG. 1, for example.

Step 602 involves retrieving data from an asset connected to the network. The asset under analysis may include any type of network device or component such as, but not limited to, a server, a mobile device, a PC, a laptop, a tablet, a printer, router, switch, firewall, or the like.

The retrieved data may include, but is not limited to, items of data present in a log record. These may include names, IP addresses, ports, byte counts, actions, usernames, user titles, or the like. This list is merely exemplary, and other items in addition to or in lieu of those mentioned here may be retrieved.

Step 604 involves classifying the retrieved data with a classifier executing a machine learning model configured to classify the data as valuable or non-valuable. A data value classifier such as the data value classifier 116 of FIG. 1 may perform step 604.

The machine learning model may be previously trained on test data that may include sensitive and confidential information, as well as benign or otherwise non-sensitive information. As discussed previously, "valuable" data may include data that can be used to trace or distinguish an individual's identity. "Valuable" data may also include data linked to an individual such as their medical, educational, or employment information.

Accordingly, the machine learning model may classify the retrieved data as "valuable" or "non-valuable" based on the presence of one or more of these types of data. The exact type of output may vary and may depend on the type of machine learning model. For example, if the machine learning model is a CNN, the output may be a score indicating the likelihood that the retrieved data is valuable, as well as a rationale behind the score (e.g., that the data classified as valuable is or includes a social security number).

Step 606 involves classifying the asset as a target or a non-target based in part on the classification of the data. For example, if the data is classified as valuable, an asset risk classifier such as the asset risk classifier 118 of FIG. 1 may automatically classify the associated asset as a target. That is, since the target is associated with valuable data, the asset may automatically be classified as a target of interest to threat actors. Or, in some embodiments, the asset risk classifier 118 may classify an asset as a target only if the assigned score is greater than some threshold.

In yet other embodiments, the asset risk classifier 118 may further consider data associated with the asset and characteristics associated with the data. For example, and as discussed previously, the asset risk classifier 118 may consider data including, but not limited to, the frequency and recentness of data file modifications, configuration of software executing on the asset, versions of software executing on the asset, known users of the asset, and other data or metrics about the asset.

As discussed previously, one or more of these asset-related features may be considered in conjunction with the classification of the data as valuable (and its accompanying score). The asset risk classifier may consider these features such that the more features present with the asset (as well as the strengths of the features), the more likely the asset risk classifier 118 will classify the asset as a target. As discussed previously, a stronger showing of one or more features may make up for a lesser showing of one or more other features such that the asset risk classifier 118 nonetheless identifies an asset as a target.

Step 608 involves updating the machine learning model with at least one of classification rules and user-guided feedback. The machine learning model may be continuously updated to improve the classification accuracy of future data. This feedback may be provided by a user such as the user 106 of FIG. 1, for example. In this case, the user may review the outputted classification and confirm or reject the classification after reviewing the underlying data.

Additionally or alternatively, the machine learning model may be updated in accordance with certain rules. For example, if data was recognized as a social security number (even if it was in a slightly format than "xxx-xx-xxxx," (such as without the dashes), the machine learning model may be updated to automatically recognize nine consecutive numerals as a social security number.

Step 610 involves implementing a security measure with respect to the data upon classifying the data as valuable. This step may be performed upon data being classified as valuable in step 604 (e.g., without waiting for the asset to be classified as a target). The security measure may involve encrypting unencrypted data, providing safeguards to protect the data, quarantining the data and/or assets associated with the data, implementing scans to detect malicious activity, or the like. Step 610 may be initiated manually by a user or autonomously.

Step 612 involves providing monetary value associated with the data classified as valuable. Step 612 may be performed by a processor executing instructions stored in memory such as the processor 108 and memory 110 of FIG. 1.

Users such as security personnel or offensive personnel may be interested in the value of data classified as valuable. This may be represented as a dollar amount or cryptocurrency amount, and may be based off of what the type of data is normally worth in markets such as on the dark web. Users may therefore be more inclined to focus their efforts to safeguard highly valuable data (in terms of value to threat actors) and assets associated with said highly valuable data.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method comprising:
    retrieving data from a network asset connected to the network, wherein the network asset is a computer or networking device that store a plurality of data;
    classifying the retrieved data with a first classifier executing a first machine learning model configured to classify the data as valuable or non-valuable and determine a score indicating a likelihood that the data is valuable or a likelihood the data is non-valuable;
    using a second classifier executing a second machine learning model:
        determining an asset risk score indicating the network asset's security risk based on a plurality of classifier inputs including (a) a classification of the data as valuable, (b) access permission data of the network asset indicating who has access to the network asset, (c) when the data first appeared on the network asset, (d) a frequency or last time of access or modification of one or more files on the network asset, and (e) one or more services exposed on the network asset, and (f) a likelihood that the data can be accessed externally from the network; and
        classifying the network asset as a target or a non-target for attackers based in part on the classification of the data as valuable, the score determined for the data, and the asset risk score;
    causing a user interface to display a visual alert issued by an alert module in response to a detection that network asset is classified as a target for attackers, wherein the detection is based on a determination that the asset risk score of the network asset exceeds a threshold;
    in response to user input received via the user interface to investigate the visual alert, causing the user interface to display (a) an identification of the network asset classified as a target for attackers, (b) a filename of the data classified as valuable, (c) the score determined for the data classified as valuable, (d) an update frequency of the data classified as valuable, and (e) a data age of the data classified as valuable;
    in response to additional user input received via the user interface, performing a mitigation measure with respect to the network asset; and
    updating the first machine learning model based on user feedback regarding classification outputs of the first classifier classifying different data as valuable or non-valuable, wherein the user feedback includes risk weights to one or more data features of the different data and improves a classification accuracy of the first machine learning model.

2. The method of claim 1, wherein the mitigation measure includes encrypting the data or quarantining the network asset.

3. The method of claim 1, wherein the data is retrieved using a data collection agent running on the network asset.

4. The method of claim 1, wherein the classification of the data as valuable is based on detection of any of a plurality of valuable data types in the data, including:
    personally identifiable information,
    a password,
    access tokens,
    hashed values,
    private keys,
    markings indicating confidential or secret data, and
    user-specified value words selected from the group consisting of project code-names and trade secret names.

5. The method of claim 1, wherein the classification of the network asset as a target or a non-target for attackers is based in part on a vote of multiple sub-modules of the second classifier.

6. The method of claim 1, further comprising: providing a monetary value associated with the data classified as valuable.

7. A system comprising:
    one or more hardware processors and associated memory, wherein the memory stores instructions executable by the one or more hardware processors to implement:
        an interface that receives data from a network asset connected to the network, wherein the network asset is a computer or networking device that store a plurality of data;
        a first classifier that executes a first machine learning model, configured to:
            classify the data as valuable or non-valuable, and
            determine a score indicating a likelihood that the data is valuable or a likelihood the data is non-valuable;
        a second classifier that executes a second machine learning model, configured to:
            determine an asset risk score indicating the network asset's security risk based on a plurality of classifier inputs including (a) a classification of the data as valuable, (b) access permission data of the network asset indicating who has access to the network asset, (c) when the data first appeared on the network asset, (d) a frequency or last time of access or modification of one or more files on the network asset, the data, and (e) one or more services exposed on the network asset, and (f) a likelihood that the data can be accessed externally from the network; and classify the network asset as a target or a non-target for attackers based in part on the classification of the data as valuable, the score determined for the data, and the asset risk score;

an alert module configured to:

cause a user interface to display a visual alert issued by an alert module in response to a detection that network asset is classified as a target for attackers, wherein the detection is based on a determination that the asset risk score of the network asset exceeds a threshold;

in response to user input received via the user interface to investigate the visual alert, cause the user interface to display (a) an identification of the network asset classified as a target for attackers, (b) a filename of the data classified as valuable, (c) the score determined for the data classified as valuable, (d) an update frequency of the data classified as valuable, and (e) a data age of the data classified as valuable;

a security measure module configured to:

in response to additional user input received via the user interface, perform implement a mitigation measure with respect to the network asset; and a model update module configured to:

update the first machine learning model based on user feedback regarding classification outputs of the first classifier classifying different data as valuable or non-valuable, wherein the user feedback includes risk weights to one or more data features of the different data and improves a classification accuracy of the first machine learning model.

8. The system of claim 7, wherein first machine learning model outputs a reason of the classification of the data as valuable, wherein the reason indicates a particular piece of data in the data that is recognized to be a type personally identifiable information or an access credential.

9. The system of claim 7, wherein the mitigation measure includes performing one or more scans of the network asset to detect malicious activity on the network asset, in response to the determination that the network asset is classified as a target for attackers.

10. The system of claim 7, wherein the classification of the data as valuable is based on detection of any of a plurality of valuable data types in the data, including:

personally identifiable information,
a password,
access tokens,
hashed values,
private keys,
markings indicating confidential or secret data, and
user-specified value words selected from the group consisting of project code-names and trade secret names.

11. The system of claim 7, wherein the first machine learning model is implemented as a convolutional neural network.

12. The system of claim 7, wherein the instructions stored on the memory are executable by the one or more hardware processors to implement a second mitigation measure autonomously upon a detection that another network asset is classified as a target for attackers, wherein the detection is based on a classification of another data on the other network asset being classified as valuable.

\* \* \* \* \*